United States Patent [19]

Schwarz et al.

[11] Patent Number: 5,385,876
[45] Date of Patent: Jan. 31, 1995

[54] ACTIVATED CARBONS MOLECULARLY ENGINEERED

[75] Inventors: James A. Schwarz, Fayetteville; Karol Putyera, Syracuse; Jacek Jagiello, Syracuse; Teresa J. Bandosz, Syracuse, all of N.Y.

[73] Assignee: Syracuse University, Syracuse, N.Y.

[21] Appl. No.: 9,778

[22] Filed: Jan. 27, 1993

[51] Int. Cl.$^6$ .................. B01J 20/12; B01J 20/10; B01J 20/20; F17C 11/00
[52] U.S. Cl. ........................... 502/80; 206/0.7; 502/60; 502/84; 502/413; 502/414; 502/416; 502/526
[58] Field of Search ............... 502/413, 414, 416, 417, 502/80, 84, 62, 80, 526

[56] References Cited

U.S. PATENT DOCUMENTS

| | | | |
|---|---|---|---|
| 1,610,408 | 12/1926 | Alexander | 502/80 |
| 4,248,739 | 2/1981 | Vaughan et al. | 502/84 |
| 4,458,030 | 7/1984 | Manabe et al. | 502/417 |
| 4,650,779 | 3/1987 | Goldstein | 502/54 |
| 4,716,736 | 1/1988 | Schwarz | 62/48 |
| 4,732,887 | 3/1988 | Obanawa et al. | 502/402 |
| 4,845,066 | 7/1989 | Fahey et al. | 502/84 |
| 5,114,902 | 5/1992 | Schwarz et al. | 502/334 |

FOREIGN PATENT DOCUMENTS

| | | |
|---|---|---|
| 286428 | 5/1912 | Germany . |
| 337060 | 5/1921 | Germany . |
| 4015555 | 11/1991 | Germany . |
| 197310 | 9/1987 | Japan .................. 502/413 |
| 2035282 | 11/1979 | United Kingdom . |

OTHER PUBLICATIONS

"Carbonization of Polyacrylonitrile in a Two-Dimensional Space Between Montmorillonite Lamellae", Carbon, vol. 26, No. 4, pp. 573–578 (1988).
Teresa J. Bandosz et al., Inverse Gas Chromatography Study of Modified Smectite Surfaces, 1992.
T. J. Bandosz, Chemical and Structural Properties of Clay Minerals Modified by Inorganic and Organic Material, 1992.

Primary Examiner—Paul E. Konopka
Attorney, Agent, or Firm—Harris Beach & Wilcox

[57] ABSTRACT

A highly microporous adsorbent material is formed as a composite of a natural or synthetic clay or clay-like mineral matrix intercalated with an active carbon. The mineral is prepared and selected to have a selected interlayer spacing between microcrystalline sheets. An organic polymeric precursor is contacted therewith to fill the matrix interstices. Then the precursor is polymerized and carbonized to yield the adsorbent material in which the carbon is intercalated into the mineral matrix. The mineral can be naturally occurring smectite or synthetic hydrotalcite.

9 Claims, 2 Drawing Sheets

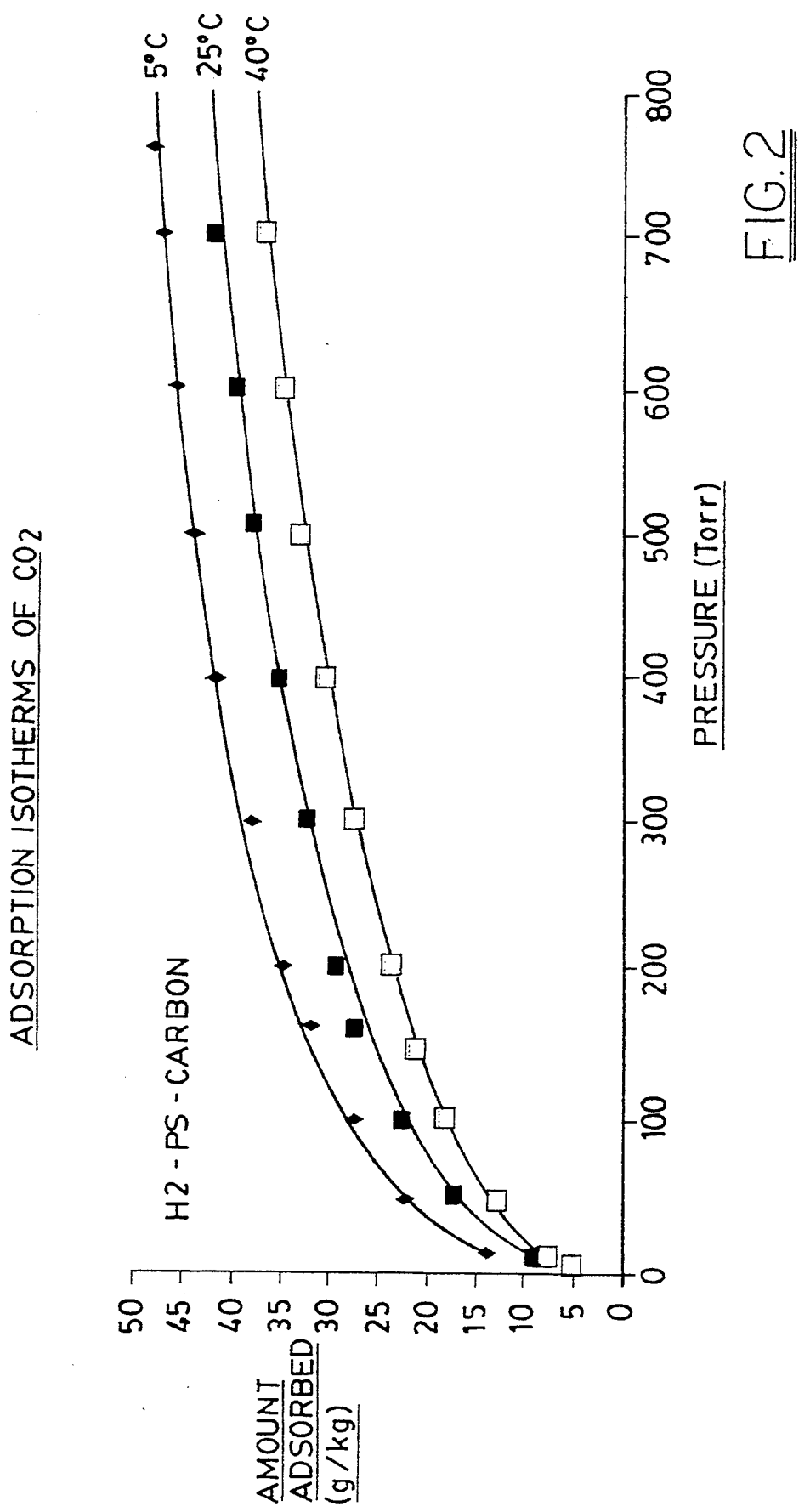

ACTIVATED CARBONS MOLECULARLY ENGINEERED

BACKGROUND OF THE INVENTION

This invention relates to active carbon adsorbents and methods of preparing same.

There has been great interest of late in storage media suitable for efficient storage of hydrogen above cryogenic temperatures. Hydrogen has become an increasingly attractive energy source, particularly because of its high energy density per unit weight and because it burns cleanly or can be used directly in fuel cells. Hydrogen is also of interest because it can be produced easily by electrolysis of water. Unfortunately, because hydrogen is highly volatile, storage thereof in sufficient quantities has been a major stumbling block to implementation of a hydrogen-based energy infrastructure. Consequently, great effort has recently been directed towards economical ways to store significant quantities of hydrogen.

Several techniques for storage of hydrogen are discussed in James A. Schwarz U.S. Pat. No. 4,716,736.

Other energy sources, such as methane, have looked attractive but they, too, have presented storage problems for practical use as a secondary energy source.

Recently, it has been observed that carbon adsorbents are much more effective if their pore geometries are related to the molecular dimension of the adsorbate, e.g., hydrogen or methane, and their sorbency is further enhanced if the pores are as uniform in geometry as possible. However, carbon structures have pore formations disposed randomly throughout and the pores tend to have random geometries. Consequently optimal storage of hydrogen, methane, or other gas in active carbon has not been achieved.

OBJECTS AND SUMMARY OF THE INVENTION

It is an object to produce a new type of active carbon material capable of enhanced storage of an adsorbate such as hydrogen.

It is another object to produce an active carbon adsorbent with pore structure as uniform in geometry as possible.

It is a further object to provide a technique for producing such adsorbent materials, which technique employs conventional non-exotic materials.

According to an aspect of this invention, a novel method is disclosed of preparing a new type of active carbon adsorbent as a composite material by carbonization of organic compounds intercalated into interlayer spaces of inorganic porous materials. These inorganic materials are clay or clay-like materials, which can include natural clays such as montmorillonite, or synthetic clay-like materials such as hydrotalcites. These inorganic materials are characterized by a matrix structure wherein the crystallites are in the form of flat, microscopic sheets. These are separated from one another by pillar-like structures formed of another material which can be an organic anion or a polyoxometallate. The spacings between successive crystallites tend to be rather uniform, so that the matrix has slit-like pores of uniform geometry.

A polymeric precursor, e.g. of a polystyrene-sulfonate anion, is introduced into the slit-like interstices in the matrix. The polymer is then synthesized within these interstices. This can come about by reason of the reactive effect of the inorganic materials of the crystallites and or by thermochemical effects.

The ratios of materials, e.g. Mg/Al in the crystallites and in the composition of the pillars can be selected for a desired charge density and spacing which can have an affect on the resulting carbon product.

Carbonization of the chemically bonded polymer precursor between layers is carried out by a heat treatment, followed by activation of the resultant carbon material.

If desired, the clay or clay-like matrix can be removed from the carbon material, e.g. by dissolving it in an inorganic acid or other reagent. The resulting highly porous carbon will be much lighter than the composite material, giving the adsorbent a higher weight-storage ratio for the hydrogen or other adsorbate.

BRIEF DESCRIPTION OF THE DRAWING

FIG. 2 is a chart of adsorption isotherms for an embodiment of this invention.

DESCRIPTION OF THE PREFERRED EMBODIMENT

Figure 1:
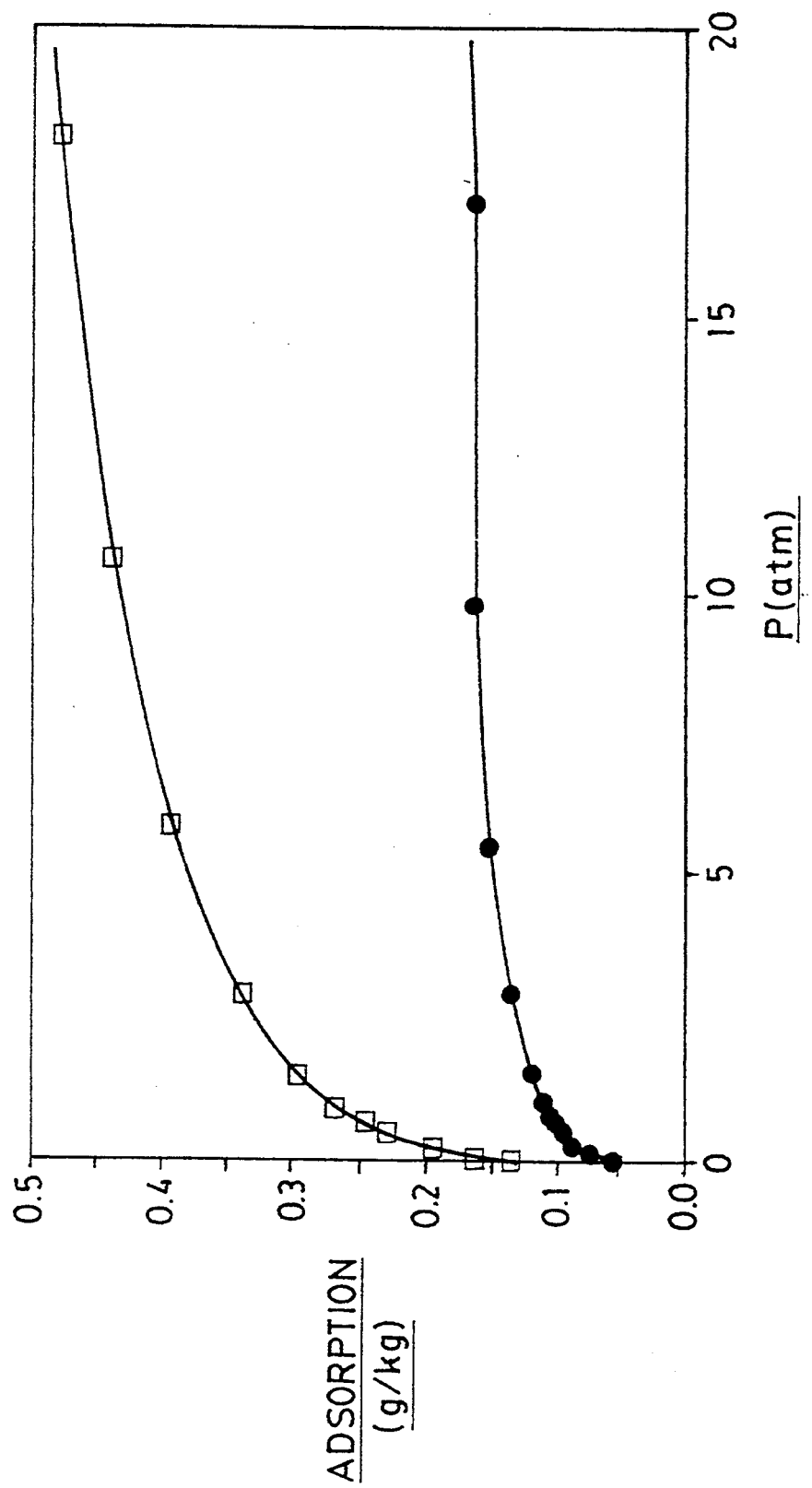
FIG. 1 is a chart of $H_2$ adsorption vs pressure showing advantageous features of the present invention.

A number of adsorbent storage media have been prepared using an inorganic material as a molecular container to provide structural uniformity and structural integrity to the resulting microporous carbon adsorbent media. Several natural and synthetic materials have been found to be suitable for use as molecular containers. These are generally considered clay or clay-like materials e.g. mixtures of magnesium salts or oxides and aluminum oxides. These materials are typically characterized by a flat microcrystalline structure, e.g., flat plates or sheets, which are separated by pillars of a suitable material so that the successive sheets are held parallel and separated by slit-like gaps of uniform thickness. A natural material for this purpose can be a smectite, such as a montmorillonite fraction separated from a Wyoming bentonite clay. A synthetic material for this can be Mg—Al—$CO_3$ hydrotalcite. The natural materials can be examined by standard known techniques, e.g. x-ray spectroscopy, for selecting the material to have a predetermined thickness of its slit-like pores. The synthetic hydrotalcites can have their gaps or pores engineered to a desired thickness by selection of pillar material.

The molecular engineering of these materials is a convenient approach to creation of novel containers for molecular precursors. These can also be used to create composite sorbents which exploit the combined properties of the mineral and the carbon.

Methods for molecular engineering of these composite materials include structural alteration by intercalation of inorganic polyions or modification of their chemical properties by incorporation of organic polymer molecules into their structure.

The method of intercalation involves the introduction of large metal polycations, in the case of smectites, or polyoxometalates, in the case of hydrotalcites, into the interlayer spaces. The polyions can act as "pillars" supporting the layers and rendering their structure rigid. The intercalated structure is characterized by large specific surface area, developed porosity and with interacting surface acido-basic properties.

The structural and chemical properties of the mineral sorbent depend on the method of modification of the initial mineral and on the heat treatments during the processing to obtain a final product.

In one possible embodiment, hydroxy-aluminum oligocations were introduced into the interlayer spaces of montmorillonite separated from a Wyoming bentonite. This material was calcined at 673K and then saturated by polyfurfuryl alcohol which was polymerized/carbonized between the silicate layers. Hydrotalcite, with a similar layer structure, but opposite acido-basic surface properties, was synthesized and its chemical structure modified by incorporation of 4-styrenesulfonate anions between its layers followed by polymerization/carbonization.

EXAMPLES

Example I

Intercalated samples were prepared from Wyoming bentonite according to known separation techniques. Briefly, the montmorillonite fraction was saturated with 1N NaCl to obtain Na-montmorillonite for ion exchange with hydroxy-aluminum cations. Two different samples were chosen for further study; they are designated as M (sodium form) and MA (hydroxy-aluminum montmorillonite heat treated at 673K for 10 hours).

Smectite-furfuryl alcohol complexes were prepared by placing dry Na-montmorillonite M and MA into 20% solutions of furfuryl alcohol (FA) in benzene. The mixture was stirred under a nitrogen atmosphere for three days at room temperature. The samples were then washed with pure benzene to remove FA adsorbed on the outer surface of smectite. The polymerization of furfuryl alcohol between the layers was carried out by heating the samples under a nitrogen flow at 353K for 24 hours and then at 423K for 6 hours. The samples of minerals with polymer in the interlayer space were heated-treated at 973K for 3 hours under a nitrogen flow in order to carry out the carbonization reaction.

Example II

Synthetic Mg—Al—$CO_3$ hydrotalcite was prepared by the reaction of an aqueous sodium aluminate solution with a stoichiometric amount of basic magnesium carbonate $4MgCO_3Mg(OH)_2.5H_2O$. The reaction was carried out using two different Mg/Al ratios, namely 3:1 and 2:1.

The interlayer space in these minerals, i.e., a hydrotalcite-like structure, provides a reactive environment. The weakness of bonding between layers allows for introduction of different anions and formation of intercalation compounds with organic and organometallic, silicate, and polyoxometalate compounds. Polyoxometalate ions introduced as pillars increase the thermal stability of these materials and after calcination they display high values of surface area. The following Table lists examples of pillared polyanions and organic compounds.

| ORGANIC ANIONS | POLYOXOMETALATES |
|---|---|
| terephtalate | $[Mo_7O_{24}]^{6-}$ |
| p-toluenesulfonate | $[V_{10}O_{28}]^{6-}$ |
| dihydroxy-benzenedisulfonate | $[PMo_6V_6O_{40}]^{5-}$ |
| naphtalenedisulfonate | $[PMo_6W_6O_{40}]^{3-}$ |
| styrenesulfonate | $[PMo_{12}O_{40}]^{3-}$ |
| polystyrenesulfonate | $[Ta_6O_{18}(OH)]^{7-}$ |
| | $[Nb_6O_{18}(OH)]^{7-}$ |
| | $[PW_{12}O_{40}]^{3-}$ |
| | $[H_2W_{12}O_{40}]^{5-}$ |

The reaction mixture was prepared as follows: 37.34 g (384 mmol $Mg^{2+}$) or 24.87 g (256 mmol $Mg^{2+}$) of magnesium salt was added continuously to an aqueous solution of $Na[Al(OH)4]$, prepared by dissolution of 10 g $Al(OH)_3.nH_2O$ (128 mmol $Al^{3+}$) in 60 ml of 50% NaOH. The former resulted in the 3:1 and the latter in the 2:1 mg/Al ratios. The suspension was stirred at 303K for 6 hours, and then the reaction mixture was heated to 358K and continuously stirred at this temperature for 18 hours. The hydrotalcite thus formed was then separated by centrifugation and washed thoroughly with deionized water to remove the sodium ions. It was then dried for 24 hours at 373K.

The 4-styrenesulfonate anion was incorporated between the layers of hydrotalcite by standard methods. Accordingly, the mixed magnesium-aluminum oxide solid solution prepared by calcination of carbonated hydrotalcite was hydrothermally reconstructed to pure and crystalline organic derivatives of hydrotalcite through the meixnerite phase. Thus, 5 g of the initial Mg—Al—$CO_3$ hydrotalcite was first calcined for 3 hours at 723K, and then this calcined product was placed into 100 ml of a 1:1 (by volume) water ethylene glycol solution. The suspension was then aged for 24 hours at 338K under a nitrogen atmosphere. After this treatment, the formed OH intercalate (meixnerite) in the presence of the organic salt sodium-4-styrenesulfonate, in stoichiometric ratio, was transformed into the hydrotalcite-type structure of the corresponding anion. To achieve crystalline products, the transformation process was carried out at 338K for 36 hours. The 4-styrenesulfonate anion in the interlayer spaces of hydrotalcite was polymerized in 0.1M aqueous solution of potassium persulfate at 358K. Carbonization of the intercalated polymer was carried out in a flow of nitrogen at 823K for 3 hours.

It has been observed that the surface free energy values of the minerals are affected by the modification process, although for both natural and synthetic minerals the surface acidity of the final product after introduction of polymers and carbonization is virtually unchanged as compared with initial values.

High values of surface free energy, $\Delta G_{CH_2}$, appear to be a characteristic of the carbon-mineral composites. Such high values for microporous carbon can be explained based on the fact that the adsorption potential for the adsorbate gas (e.g. $H_2$ or $CH_4$) is strongly enhanced in the slit-like micropores.

Various carbon mineral composite adsorbents have been prepared and examined, and these have had an interlayer space between about 0.26 nm to 0.70 nm in the case of adsorbents of Example I, or between about 0.28 and 1.53 nm in the case of hydrotalcites of Example II. The modification process of intercalation, polymerization, and calcination causes small increases or decreases in the interlayer distance. Generally, for synthetic hydrotalcites, carbonization leads to a small increase in the interlayer distance as compared with their initial forms.

The composite mineral-carbon media can be used as storage media with excellent adsorption properties for a target adsorbate and also with high structural strength and integrity. However, the mineral component can be removed by dissolution in a strong acid such as HCl or HF, leaving the microporous carbon. This adsorbent medium has high affinity for the target adsorbate, but is extremely light weight.

Because the materials employed are easily available and can be easily handled, large amounts of sorbent material can be economically prepared. This makes the product especially attractive as a storage medium for secondary energy source gases such as hydrogen or methane, where large volumes of the adsorbate are likely to be encountered.

The product material can be employed in a number of other applications as well, such as filtering or membrane separation; fuel cells; as catalytic membrane for aerosol/particulate abatement; as catalyst support e.g. in ammonia synthesis; for conductive polymers; dielectric materials; fuel cell electrodes; or in medical treatments e.g. as selective scavengers of ingested poisons.

In conclusion, we have found that carbonization of chemically bonded polyanions between the layers of hydrotalcite at 550° C. (823K) followed by activation of the resultant material under a variety of thermal treatments between 150 and 500° C. (423K to 773K), has yielded a calcined mineral matrix/active carbon system with a developed microporosity, and with high adsorption over a range of temperatures and pressures.

Carbonization of polystyrene sulfonate derivatives of hydrotalcite leads to formation of a calcined hydrotalcite matrix and active carbon system with a desirable developed microporosity. The amount of intercalated organic material can be varied to yield, after carbonization, mineral matrix/active carbon systems with different adsorption characteristics. In particular, the interstitial or interlayer distance in the matrix can be varied to correspond with the desired pore geometry for a given target adsorbate. The adsorption capacity has been found to increase with the temperature of pretreatment of the calcined mineral matrix-active carbon system.

FIG. 1 shows hydrogen adsorption characteristics of adsorptive medium prepared according to Example I of this invention, here using a calcined hydroxy aluminum smectite prepared with polyfurfuryl alcohol which is polymerized and then carbonized (upper curve), compared with a control adsorptive medium made of the smectite saturated with polyfurfuryl alcohol and then carbonized (lower curve). The threefold increase in absorptivity is believed to come about from the chemical events occurring during processing of the alcohol in the uniform slit-like micropores.

FIG. 2 shows adsorptive curves of a synthetic hydrotalcite based adsorption medium for $CO_2$. Here, a chemically bonded polyanion, namely poly(4-styrene sulfonate) was formed between layers of magnesium-/aluminum based crystallites, and carbonized at about 823K to yield a calcined hydrotalcite activated carbon system, with developed microporosity. Adsorption was measured at 5° C. (278K), 25° C. (298K), and 40° C. (313K). The isosteric heat of adsorption was found to be 34 KJ/mol, a value whose magnitude is consistent with adsorption in small micropores.

From these data it can be concluded that carbonization of polystyrene sulfonate derivative of hydrotalcite leads to the formation of microporous calcined hydrotalcite/active carbon systems. The conclusion that this system is microporous is based on a comparison of the isoteric heats of adsorption of $CO_2$ on the materials known to be microporous (e.g., Zeolite A 43 KJ/mol, BPL carbon 25 KJ/mol).

The invention has been described here with reference to a few illustrative examples. However, the invention is not limited to those examples. Rather, many modifications and variations thereof would present themselves to those of skill in the art without departure from the principles of this invention, as defined in the appended claims.

We claim:

1. A microporous carbon adsorbent material comprising an inorganic matrix and active carbon supported within said matrix, wherein said matrix is a pillared natural or synthetic clay material in the form of layers spaced from one another by pillars of an inorganic pillaring material that is selected to define slit-like microporous interstices therebetween molecularly engineered with a pore size that corresponds to a given target adsorbate, and said active carbon is intercalated between said layers of said matrix.

2. The microporous carbon adsorbent of claim 1 wherein said matrix is in the form of a natural clay material.

3. A microporous carbon adsorbent material comprising an inorganic matrix and active carbon supported within the matrix, where said matrix is formed of synthetic hydrotalcite layered structures in the form of layers spaced from one another by pillars of an inorganic pillaring material that is selected to define slit-like microporous interstices therebetween, the interstices being molecularly engineered to have a pore size that corresponds to a given target adsorbate, and said active carbon is intercalated between said layers of said material.

4. A process of molecularly engineering a microporous active carbon adsorbent to have slit-like micropores whose size corresponds to a given target adsorbate, comprising the steps of preparing a matrix of a pillared inorganic natural or synthetic clay material in the form of layers spaced from one another by pillars of an inorganic pillaring material to define slit-like microporous interstices between successive ones of said layers, the interstices being molecularly engineered to have said pore size that corresponds to said given target adsorbate; contacting said matrix with an organic polymeric precursor so that the interstices in the matrix are filled with the precursor; and carbonizing said organic precursor within the slit-like interstices of said matrix to yield the adsorbent in which the carbon is intercalated into the interstices of the inorganic matrix as said microporous active carbon adsorbent.

5. The process of claim 4 wherein said preparing the matrix includes forming said matrix of a synthetic hydrotalcite layered structure and separating layers thereof with pillars to form said interstices of a selected uniform width.

6. The process of claim 4, wherein said carbonizing is carried out by treating said precursor to form a polymer thereof within said interstices; and then calcining said polymer to yield said active carbon.

7. A process of molecularly engineering a microporous active carbon adsorbent, comprising the steps of
preparing a matrix of a pillared natural or synthetic inorganic clay material in the form of layers spaced from one another by pillars of an inorganic pillaring material that is selected to define slit-like microporous interstices between successive ones of said sheets, such that the interstices are molecularly engineered to have a pore size that corresponds to a given target adsorbate;

contacting said matrix with an organic polymeric precursor so that the interstices in the matrix are filled with said precursor;

carbonizing said organic precursor within the slit-like interstices of said matrix to produce a structure in which the carbon is intercalated into the interstices of the inorganic matrix; and removing the matrix from the active carbon to yield said adsorbent in the form of active carbon layers defining therebetween slit-like micropores of a substantially uniform and preselected width that corresponds to said target adsorbate.

8. The process of claim 7 wherein said removing is carried out by dissolving the inorganic matrix in an inorganic reagent.

9. A microporous carbon adsorbent material prepared by the process of claim 7 which consists essentially of microscopic sheets of active carbon spaced from one another to define therebetween slit-like micropores of a substantially uniform preselected width that is molecularly engineered such that interstices between said sheets correspond to a given target adsorbate.

* * * * *